United States Patent [19]
Oshima

[11] 4,422,534
[45] Dec. 27, 1983

[54] DISC BRAKE

[75] Inventor: Harumi Oshima, Kawasaki, Japan

[73] Assignee: Tokico Ltd., Kawasaki, Japan

[21] Appl. No.: 456,726

[22] Filed: Jan. 10, 1983

Related U.S. Application Data

[63] Continuation of Ser. No. 207,432, Nov. 17, 1980, abandoned.

[30] Foreign Application Priority Data

Nov. 20, 1979 [JP] Japan .................. 54-160716[U]
Nov. 20, 1979 [JP] Japan .................. 54-160718[U]

[51] Int. Cl.³ ............................................ F16D 55/224
[52] U.S. Cl. ..................................................... 188/73.38
[58] Field of Search ............... 188/73.35, 73.36, 73.37, 188/73.38, 205 A, 73.1, 73.39; 192/30 V

[56] References Cited

U.S. PATENT DOCUMENTS

| | | | |
|---|---|---|---|
| 4,134,477 | 1/1979 | Asquith | 188/73.36 |
| 4,181,200 | 1/1980 | Souma | 188/73.38 |
| 4,196,794 | 4/1980 | Matsamoto | 188/73.37 |
| 4,245,723 | 1/1981 | Moriya | 188/73.38 X |

FOREIGN PATENT DOCUMENTS

| | | | |
|---|---|---|---|
| 2314700 | 10/1974 | Fed. Rep. of Germany ... | 188/73.38 |
| 51-14670 | 2/1976 | Japan . | |
| 51-33911 | 9/1977 | Japan . | |
| 52-47608 | 4/1978 | Japan . | |
| 54-35566 | 3/1979 | Japan .................. | 188/73.38 |

Primary Examiner—George E. A. Halvosa
Attorney, Agent, or Firm—Wenderoth, Lind & Ponack

[57] ABSTRACT

A disc brake including a stationary member secured to a non-rotatable part of a vehicle, a pair of friction pads provided on opposite sides of a rotatable disc, a caliper supported on the stationary member and being displaceable in the direction of the axis of the disc, a brake actuator incorporated in the caliper for applying one friction pad against one surface of the disc and displacing the caliper to apply the other friction pad against the other surface of the disc. The stationary member has a pair of arms which are spaced in the circumferential direction with respect to the disc and respectively straddle the circumference of the disc to extend from one side of the disc to the other side for supporting the friction pads. A pad spring formed of an elongated member and by bending process is provided between the pad springs and each of the arms which supports the central portion of the pad spring.

22 Claims, 11 Drawing Figures

DISC BRAKE

This is a Continuation Application of Application Ser. No. 207,432, filed Nov. 17, 1980, now abandoned.

BACKGROUND OF THE INVENTION

This invention relates to disc brakes and, particularly to disc brakes of the kind including a stationary member secured to a non-rotatable part of a vehicle and having a pair of arms spaced in the direction of the circumference of a rotatable disc, the arms respectively straddling the circumference of the disc to extend from one side of the disc to the other side, a caliper slidably supported on the stationary member, a pair of friction pads slidably supported on circumferentially opposing walls of the arms, and a brake actuator provided on one side of the disc for pressing one friction pad against one side of the disc and slidably displacing the caliper on the stationary member thereby pressing the other friction pad against the other surface of the disc. More particularly, this invention relates to improvements in pad springs used in disc brakes of the aforementioned kind.

Conventional pad springs used in disc brakes of the kind comprise an elongated and widthwise curved pressing portion for engaging with the friction pads, and generally rectangular engaging portions extending integrally and oppositely in the widthwise directions from the central portion of the pressing portion for engaging respectively with the caliper and the arm. The pad spring effectively locates the friction pads and suppress the vibrations of the caliper and the friction pads. However, there are problems that the assembling operation is complicated, and that the exploded configuration of the pad spring is relatively large and complicated thereby increasing the manufacturing costs.

SUMMARY OF THE INVENTION

An object of the present invention is to solve the problems aforementioned. According to the invention a pad spring formed by bending an elongated member is provided between the friction pads and each of the arms of the stationary member which supports the central portion of the pad spring.

Preferably, the pad spring is formed of an elongated sheet metal, and a projection is formed on each of the opposing walls of the arms.

Further objects and advantages of the invention will be apparent from the following description, reference being had to the accompanying drawings illustrating a prior art disc brake and some embodiments of the present invention.

DETAILED DESCRIPTION OF THE PREFERRED EMBODIMENTS

Figure 1:
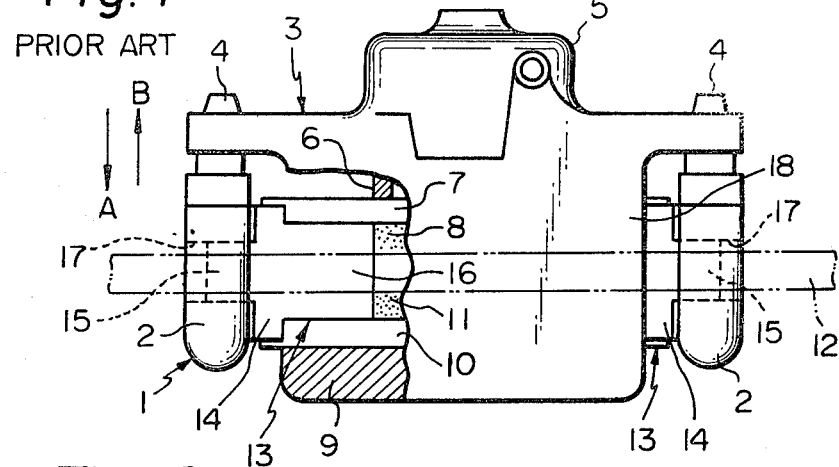
FIG. 1 is a partially broken plan view of a prior art disc brake.
Figure 2:
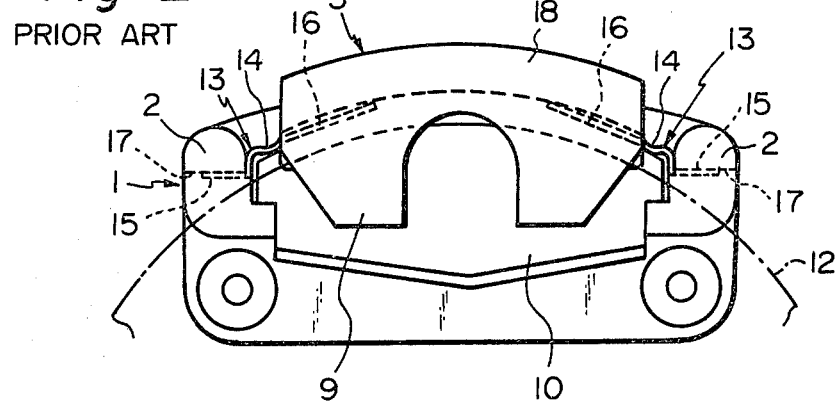
FIG. 2 is a front view of the disc brake of FIG. 1.
Figure 3:
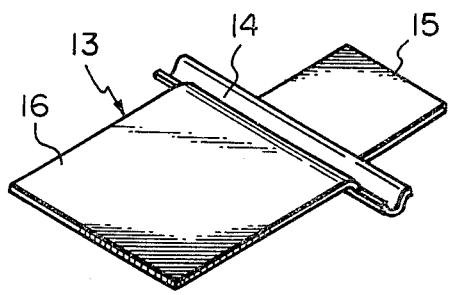
FIG. 3 is a perspective view of a pad spring used in the disc brake of FIG. 1.

FIGS. 1 and 2 illustrate a typical prior art disc brake of the kind aforementioned which comprises a stationary member 1 adapted to be secured to a non-rotatable part of a vehicle (not shown). The stationary member 1 has a pair of arms 2 and 2 which are spaced in the direction of the circumference of a rotatable disc 12 and respectively straddle the circumference of the disc 12 to extend from one side (the upper side as seen in FIG. 1) to the other side of the disc 12. A caliper 3 is slidably supported on the stationary member 1 by a pair of guide pins 4 and 4 to slide in the direction of the axis of the disc 12 or in the arrows A and B directions in FIG. 1. One of limb portions 5 of the caliper 3 incorporates a brake actuator comprising a piston 6 which moves in the arrow A direction when pressurized liquid is supplied to the brake actuator. The piston 6 engages with a backing plate 7 of a friction pad 8. The other limb portion 9 of the caliper 3 engages with a backing plate 10 of another friction pad 11. The friction pads 8 and 11 are supported on circumferentially opposing walls of the arms 2 and 2 of the stationary member 1. When the piston 6 displaces in the arrow A direction, the friction pad 8 is pressed against one surface of the disc 12 which is rotating with a wheel of the vehicle. The caliper 3 displaces in the arrow B direction due to the reaction force so that the other friction pad 11 is pressed against the other surface of the disc 12, thereby braking the rotation of the disc 12. Further, there are provided pad springs 13 and 13 between the caliper 3, the stationary member 1 and the backing plates 7 and 10 of the friction pads 8 and 11. As shown in FIG. 3, each pad spring 13 consists of an elongated and widthwise curved pressing portion 14, and generally rectangular engaging portions 15 and 16 extending integrally and oppositely in the widthwise directions from the central portion of the pressing portion 14. The engaging portion 15 resiliently engages with the lower surface of a recess 17 which is formed in each arm 2 of the stationary member 1. The other engaging portion 16 resiliently engages with the inner surface of a bridge portion 18 of the caliper 3, and the pressing portion 14 resiliently engages with the upper or radially outer surface of the backing plates 7 and 10 of the friction pads 8 and 11. The pad springs 13 press the friction pads 8 and 11 against the arms 2 and 2 and prevent vibrations of the friction pads and the caliper 3 and, also, permit axial movement of the friction pads and the caliper. However, there are shortcomings that the assembling operation is troublesome and time consuming since the pad springs 13 are located between the stationary member, the friction pads and the caliper, and that the exploded configuration of the pad spring is large and complicated thus increasing the manufacturing costs.

Now, description will be made with respect to a first embodiment of the present invention in conjunction with FIGS. 4–6. It will be understood that FIG. 4 is a partially broken perspective view of a disk brake which is generally similar to the disc brake shown in FIGS. 1 and 2, and, therefore, the same numerals have been applied to corresponding parts and detailed description therefor is omitted.

Figure 4:
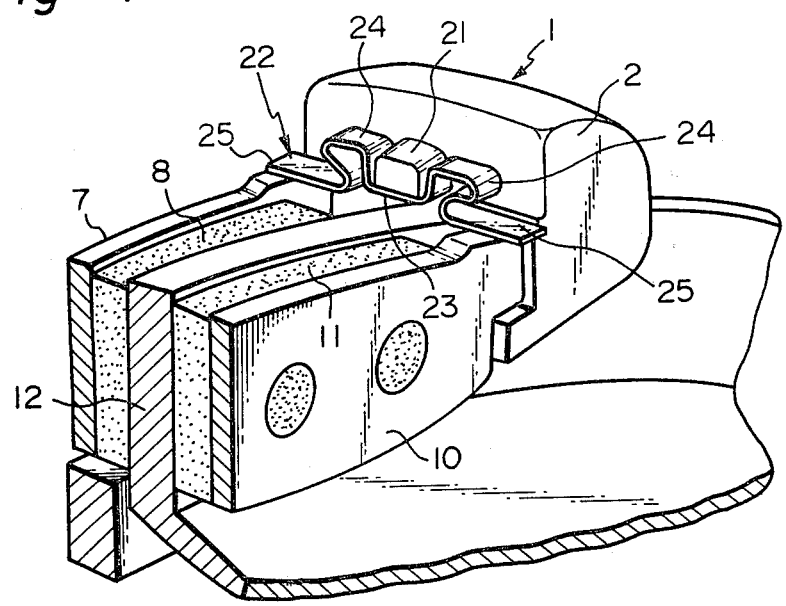
FIG. 4 is a partially broken perspective view of the essential portion of a disc brake according to the invention.
Figure 5:
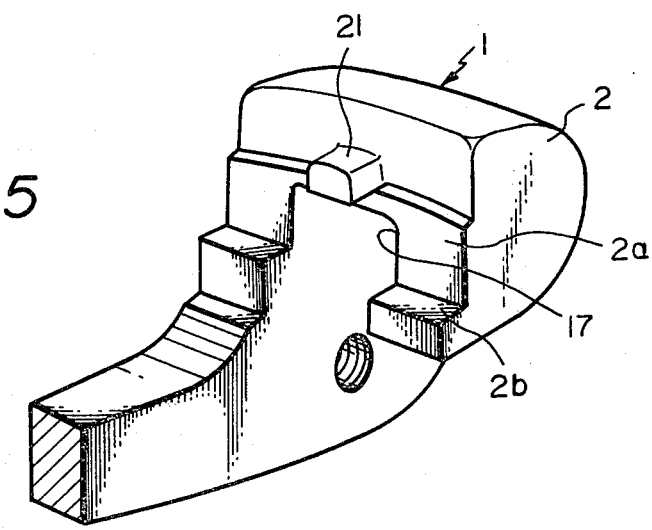
FIG. 5 is a partially broken perspective view of a stationary member of the disc brake of FIG. 4.
Figure 6:
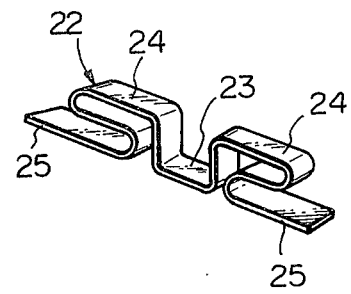
FIG. 6 is a perspective view of a pad spring used in the disc brake of FIG. 4.

As seen in FIGS. 4 and 5, a generally rectangular projection 21 is integrally formed in the plane of disc 12 outside the circumference of disc 12 on each of opposing walls of two arms 2 and 2 (only one is shown) of a stationary member 1. A pad spring 22 according to the invention is formed of an elongated resilient strip and is bent in a plane along lines perpendicular to the axis of rotation of disc 12 as shown in FIG. 6. The pad spring 22 comprises a generally U-shaped engaging portion 23, centrally located with respect to friction pads 8 and 11 and generally S-shaped resilient portions 24 integrally connected with the free radially outward ends of the engaging portions 23 respectively engaging portions 23 each have spaced generally radially extending side walls connected to each other at their radially inward ends by a base portion and to resilient portions 24 at their radially outward ends. The lower legs of resilient portion 24 constitute pressing portions 25 which extend in a direction parallel the axis of rotation of disc 12. The engaging portion 23 engages with the projection 21 of the arm 2 of the stationary member 1. The pressing portions 25 and 25 engage respectively with the upper surfaces of the backing plates 7 and 10 of the friction pads 8 and 11 so that the backing plates 7 and 10 are urged radially inwardly toward the axis of rotation of disc 12 against radially outwardly facing shoulders 2b (FIG. 5) which are formed on each of opposing walls of the arms 2. The U-shaped engaging portion 23 may resiliently engage with the projection 21 so as to retain the pad spring 22 on the projection 21, however, the radially outward facing surface of the base portion of engaging portion 23 may simply engage with the lower surface of the projection 21 to transmit vertical resilient force (ie, resilient force directed radially outwardly away from the axis of rotation of disc 12) between the friction pads and the projection 21.

Figure 7:
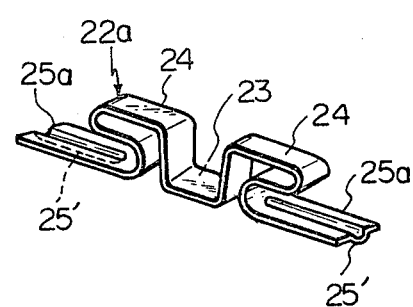
FIG. 7 is a view similar to FIG. 6 but showing a modified form.

FIG. 7 shows a modified pad spring 22a wherein a longitudinally extending ridge 25′ is formed in each of pressing portions 25a to augment the rigidity of the pressing portions 25a, whereby a uniform pressing force will act on the friction pad 8 or 11 irrespective to the relative positions between the pressing portion 25a and the friction pads in the direction of the axis of the disc.

Figure 8:
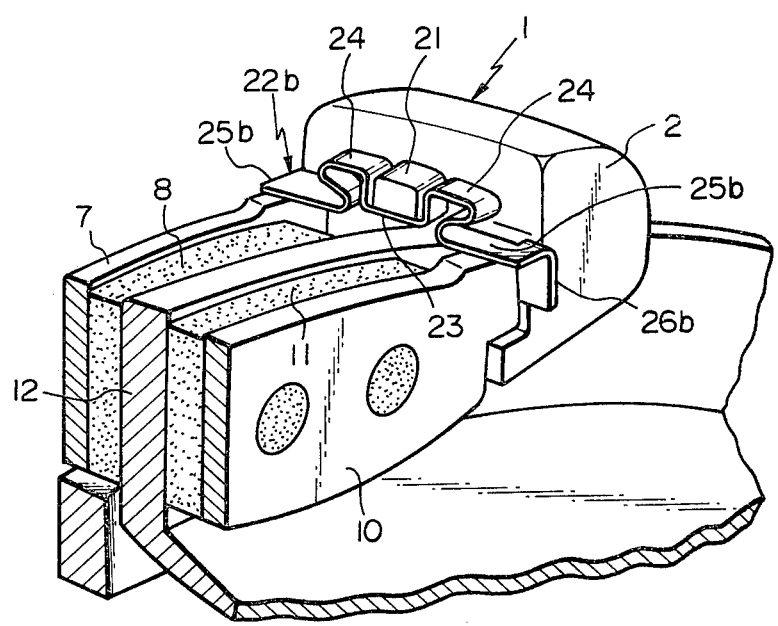
FIG. 8 is a partially broken perspective view similar to FIG. 4 but showing a second embodiment of the invention.
Figure 9:
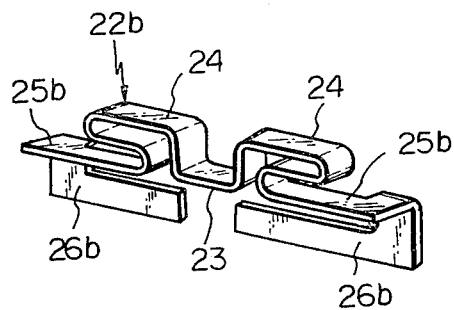
FIG. 9 is a perspective view of a pad spring used in the disc brake of FIG. 8.

FIGS. 8 and 9 illustrate another embodiment of the present invention having a pad spring 22b. The pad spring 22b is generally similar to the pad spring 22 shown in FIG. 6, but each pressing portion 25b of the pad spring 22b is integrally connected to another pressing portion 26b along a bend which extends parallel to the axis of rotation of disc 12. The pressing portions 25b of the pad spring 22b press the backing plates 7 and 10 of the friction pads 8 and 11 in the radially inward direction with respect to the disc 12 and against radially outwardly facing shoulders 2b (FIG. 5), and the pressing portions 26b press the backing plates 7 and 10 in the circumferential direction with respect to the disc. Therefore, it is possible to suppress the vibrations of the friction pads both in the radial and circumferential directions with respect to the disc, thereby reducing rattling noises of the disc brake and assuring smooth axial movement of the friction pads in applying or releasing the brake.

Figure 10:
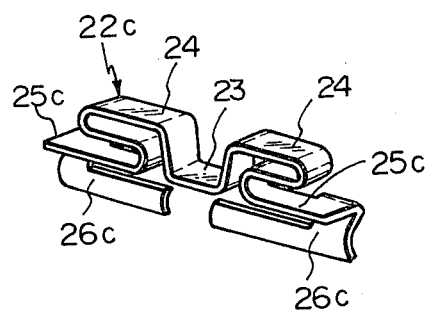
FIG. 10 is a view similar to FIG. 8 but showing a modified pad spring.
Figure 11:
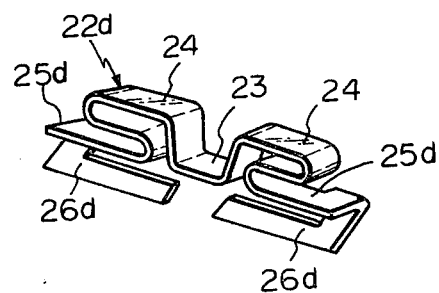
FIG. 11 is a view similar to FIGS. 9 and 10 but showing a further modified form.

FIGS. 10 and 11 respectively show pad springs 22c and 22d modified from the pad spring 22b of FIG. 9. The pad spring 22c has curved pressing portions 26c and 26c as shown in the drawing and the pad spring 22d has inclined pressing portions 26d and 26d. In both cases the clamping force of the pad spring against the friction pads in the circumferential direction with respect to the disc can be augmented, and smooth sliding movement of the friction pads in the axial direction can be assured.

In the embodiments, the pad springs are formed of sheet metal, but the pad springs may be formed of a rod member. In such case, the projection 21 may be substituted by a recess which receives and supports the central portion of the pad spring.

As described heretofore, according to the invention, a pad spring formed of an elongated member and by bending process is provided between the friction pads and each of the arms of the stationary member which supports the central portion of the pad spring, thus, it is possible to simplify the assembling operation, to suppress vibrations of the friction pads, and to assure smooth sliding movement of the friction pads being supported on the stationary member.

What is claimed is:

1. In a disc brake of the kind including a stationary member securable to a non-rotatable part of a vehicle and having first and second arms spaced along and extending across the circumference of a disc which is rotatable about an axis of rotation, a caliper slidably supported on the stationary member, a pair of friction pads slidably supported on opposing walls of the respective first and second arms, a brake actuator provided on one side of the disc for pressing one of the pair of friction pads against the one side of the disc and slidably displacing the caliper on the stationary member, thereby pressing the other one of the pair of friction pads against the other side of the disc, the improvement comprising:

the opposing walls of the first and second arms having outwardly facing shoulders for supporting circumferentially opposite ends of the pair of friction pads, the opposing wall of the first arm and the opposing wall of the second arm respectively having first and second projections opposing and extending toward each other located radially outward of the circumference of the disc;

first and second pad springs respectively integrally formed by bending separate elongated members in corresponding planes and respectively having first and second generally U-shaped central portions in said planes; each of said first and second pad springs having first and second pressing portions extending in a corresponding one of said planes continuously in directions parallel the axis of rotation of the disc from opposing sides of said first and second central portions so as to press the pair of friction pads radially inwardly toward the axis of rotation of the disc and against said shoulders, and having first and second resilient portions bent in the corresponding one of said planes respectively joining said first and second pressing portions; said first and second central portions each including spaced generally radially extending first and second side walls having radially outward ends and radially inward ends formed in the corresponding one of said planes and a base portion having a radially outward facing surface, formed in the corresponding one of the planes connecting said radially inward ends; said first and second resilient portions of said first and second pad springs being joined to said first and second central portions at said outward ends; said first and second projections extending between said first and second side walls of said first and second central portions on said radially outward surface of said base portion so that said first and second central portions of said first and second pad springs are respectively retained by said first and second projections at least in the direction radially outwardly away from the axis of rotation of the disc.

2. In a disc brake as set forth in claim 1, wherein each of said first and second pad springs has another pressing portion for each one of the pair of friction pads to press the pair of friction pads circumferentially with respect to the disc.

3. In a disc brake as set forth in claim 2, wherein said another pressing portion of said first and second pad springs acts between one of the pair of friction pads and a corresponding one of said opposing walls of the first and second arms.

4. In a disc brake as in claim 2, wherein said another pressing portion is formed by bending said elongated member along a line parallel to the axis of rotation of the disc.

5. A disc brake as in claim 2, wherein said first and second projections are located in the plane of the disc.

6. In a disc brake as set forth in claim 1, wherein each of said first and second pad springs is formed from sheet metal.

7. In a disc brake as set forth in claim 1, wherein said first and second central portions of said first and second pad springs are respectively resiliently retained by said first and second projections.

8. A disc brake as in claim 1, wherein said first and second elongated members are bent principally along lines perpendicular to the axis of rotation of the disc.

9. A disc brake as in claim 7, wherein said first and second projections are located in the plane of the disc.

10. In a disc brake as in claim 1, wherein said first and second central portions each have a plurality of bends extending perpendicularly to the axis of rotation of the disc.

11. In a disc brake as in claim 1, wherein said resilient portions and said first and second central portions each have a plurality of bends extending perpendicularly to the axis of of rotation of the disc.

12. In a disc brake of the kind including a disc rotatable about an axis of rotation, a stationary member securable to a non-rotatable part of a vehicle and having first and second arms spaced along and extending across the circumference of the disc, a caliper slidably supported on the stationary member, a pair of friction pads slidably supported on opposing walls of the respective first and second arms, a brake actuator provided on one side of the disc for pressing one of the pair of friction pads against the one side of the disc and slidably displacing the caliper on the stationary member, thereby pressing the other one of the pair of friction pads against the other side of the disc, the improvement comprising:

the opposing walls of the first and second arms having outwardly facing shoulders for supporting circumferentially opposite ends of the pair of friction pads, the opposing wall of the first arm and the opposing wall of the second arm respectively having first and second projections;

first and second pad springs respectively integrally formed by bending separate elongated members in corresponding planes and respectively having first and second generally U-shaped central portions in said planes; each of said first and second pad springs having pressing portions extending in a corresponding one of saidplanes continuously in directions parallell the axis of rotation of the disc from opposing sides of said first and second central portions so as to press the pair of friction pads radially inwardly toward the axis of rotation of the disc and against said shoulders, and having first and second resilient portions bent in the corresponding one of said planes respectively joining said first and second pressing portions; said first and second central portions each including spaced generally radially extending first and second side walls having radially outward ends and radially inward ends formed in the corresponding one of said planes and a pair portion having a radially outward facing surface, formed in the corresponding one of the planes connecting said radially inward ends; said first and second resilient portions of said first and second pad springs being joined to said first and second central portions at said outward ends; said first and second projections extending between said first and second side walls of said first and second central portions on said radially outward surface of said base portion so that said first and second central portions of said first and second pad springs are respectively supported by said first and second projections at least in the direction radially outwardly away from the axis of rotation of the disc.

13. In a disc brake as set forth in claim 12, wherein each of said first and second pad springs has another pressing portion for each one of the pair of friction pads to press the pair of friction pads circumferentially with respect to the disc.

14. In a disc brake as set forth in claim 13, wherein said another pressing portion of said first and second pad springs acts between one of the pair of friction pads and a corresponding one of said opposing walls of the first and second arms.

15. In a disc brake as in claim 13, wherein said another pressing portion is formed by bending said elongated member along a line parallel to the axis of rotation of the disc.

16. In a disc brake as in claim 12, wherein said first and second central portions each have a plurality of bends extending perpendicularly to the axis of rotation of the disc.

17. In a disc brake as in claim 12, wherein said resilient portions and said first and second central portions each have a plurality of bends extending perpendicularly to the axis of rotation of the disc.

18. In a disc brake as in claim 12, wherein said first and second projections oppose each other and are located radially outwardly of the circumference of the disc, said first and second pad springs being respectively retained by said first and second projections.

19. In a disc brake as in claim 18, wherein said first and second central portions are centrally located with respect to the pair of friction pads, said first and second pressing portions of each of said first and second pad springs being located on opposite sides of said first and second central portions.

20. In a disc brake of the kind including a disc rotatable about an axis of rotation, a stationary member securable to a non-rotatable part of a vehicle and having first and second arms spaced along and extending across the circumference of the disc, a caliper slidably supported on the stationary member, a pair of friction pads on opposite sides of the disc slidably supported on opposing walls of the respective first and second arms, a brake actuator provided on one side of the disc for pressing one of the pair of friction pads against the one side of the disc and slidably displacing the caliper on the stationary member, thereby pressing the other one of the pair of friction pads against the other side of the disc, the improvement comprising:

outwardly facing shoulders on the opposing walls of the first and second arms for supporting circumferentially opposite ends of the pair of friction pads, the opposing wall of the first arm and the opposing wall of the second arm respectively having first and second projections;

first and second pad springs respectively integrally formed by bending separate elongated members in corresponding planes and respectively having first and second generally U-shaped central portions in said planes, each of said first and second pad springs having pressing portions extending in a corresponding one of said planes continuously in opposite directions parallel the axis of rotation of the disc from opposing sides of said first and second central portions so as to press the pair of friction pads radially inwardly toward the axis of rotation of the disc and against said shoulders, and having first and second resilient portions bent in the corresponding one of said planes respectively joining said first and second pressing portions; said first and second central portions each including spaced generally radially extending first and second side walls having radially outward ends and radially inward ends formed in the corresponding one of said planes and a base portion, having a radially outward facing surface, formed in the corresponding one of the planes connecting said radially inwardly ends; said first and second resilient portions being joined to said first and second central portions at said outward ends, said first and second projections extending between said first and second side walls of said first and second central portions on said radially outward surface of said base portion so that said first and second central portions of said first and second pad springs are respectively retained by said first and second projections at least in the direction radially outwardly away from the axis of rotation of the disc.

21. A disc brake as in claim 20, wherein said first and second elongated members are bent principally along lines perpendicular to the axis of rotation of the disc.

22. In a disc brake as in claim 20, wherein said resilient portions and said first and second portions each have a plurality of bends extending perpendicularly to the axis of rotation of the disc.

* * * * *